(12) United States Patent
Maruyama

(10) Patent No.: US 8,697,306 B2
(45) Date of Patent: Apr. 15, 2014

(54) ELECTROLYTE ELECTRODE ASSEMBLY AND METHOD FOR PRODUCING THE SAME

(75) Inventor: Mari Maruyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 698 days.

(21) Appl. No.: 12/441,356

(22) PCT Filed: Sep. 12, 2007

(86) PCT No.: PCT/JP2007/068223
§ 371 (c)(1),
(2), (4) Date: Mar. 13, 2009

(87) PCT Pub. No.: WO2008/032862
PCT Pub. Date: Mar. 20, 2008

(65) Prior Publication Data
US 2009/0239119 A1    Sep. 24, 2009

(30) Foreign Application Priority Data

Sep. 14, 2006  (JP) ................................ 2006-249025
Jun. 20, 2007  (JP) ................................ 2007-162667

(51) Int. Cl.
*H01M 8/10* (2006.01)
*H01M 8/24* (2006.01)
*B05D 5/12* (2006.01)

(52) U.S. Cl.
USPC ........................................ 429/465; 427/115

(58) Field of Classification Search
None
See application file for complete search history.

(56) References Cited

U.S. PATENT DOCUMENTS

| 4,710,227 | A | * | 12/1987 | Harley et al. | 149/47 |
| 5,686,199 | A | * | 11/1997 | Cavalca et al. | 429/514 |
| 2002/0012825 | A1 | | 1/2002 | Sasahara et al. | |
| 2003/0012994 | A1 | | 1/2003 | Kushibiki et al. | |
| 2004/0013924 | A1 | | 1/2004 | Park et al. | |
| 2004/0265663 | A1 | | 12/2004 | Badding et al. | |
| 2005/0074650 | A1 | * | 4/2005 | Sridhar et al. | 429/30 |
| 2006/0154135 | A1 | * | 7/2006 | Horiuchi et al. | 429/44 |

FOREIGN PATENT DOCUMENTS

| EP | 1650823 A1 | 4/2006 |
| JP | 7-245113 | 9/1995 |
| JP | 2003-346842 | 12/2003 |

OTHER PUBLICATIONS

International Search Report for Application No. PCT/US2007/068223, dated Mar. 27, 2008.
Japanese Office Action for Application No. 2007-162667, 9 pages, dated Sep. 4, 2012.

* cited by examiner

*Primary Examiner* — Patrick Ryan
*Assistant Examiner* — Sarah A Slifka
(74) *Attorney, Agent, or Firm* — Nelson Mullins Riley & Scarborough LLP; Anthony A. Laurentano

(57) ABSTRACT

Plural columnar recesses are formed in a depressed form, on one end surface of a solid electrolyte disposed on a side facing an anode. Accordingly, the solid electrolyte is formed with a thick-walled portion and thin-walled portions, wherein the thick-walled portion extends from an abutment surface with respect to the anode to an abutment surface with respect to a cathode. The thin-walled portions extend from the abutment surface with respect to the cathode to the columnar recesses, and further have a thickness smaller than that of the thick-walled portion. Therefore, the anode also is formed on bottom and side wall surfaces of the columnar recesses. In the obtained electrolyte electrode assembly, a calculated value of conductance per unit area is set at 2 to 30 S/cm$^2$.

11 Claims, 13 Drawing Sheets

ELECTROLYTE ELECTRODE ASSEMBLY AND METHOD FOR PRODUCING THE SAME

RELATED APPLICATIONS

This application is a 35 U.S.C. 371 national stage filing of International Application No. PCT/JP2007/068223, filed on Sep. 12, 2007, which claims priority to Japanese Patent Application No. 2006-249025 filed on Sep. 14, 2006, and Japanese Patent Application No. 2007-162667 filed on Jun. 20, 2007 in Japan. The contents of the aforementioned applications are hereby incorporated by reference.

TECHNICAL FIELD

The present invention relates to an electrolyte electrode assembly, which is formed by an anode and a cathode with a solid electrolyte interposed therebetween, and wherein the electrolyte electrode assembly is preferably interposed between a pair of separators constituting a unit cell of a fuel cell. The present invention also relates to a method for producing the electrolyte electrode assembly.

BACKGROUND ART

A solid oxide fuel cell (SOFC) is known as one type of fuel cell, which has a unit cell constructed such that an electrolyte electrode assembly, including a solid electrolyte that is disposed between an anode and a cathode, is interposed between a pair of separators. In the SOFC, for example, oxide ions ($O^{2-}$) are generated by ionizing oxygen on the cathode, wherein the $O^{2-}$ ions move toward the anode through the solid electrolyte.

Therefore, in the SOFC, it is highly desired that the ions can move easily through the electrolyte electrode assembly, in order to quickly accelerate a power generation reaction. In other words, ohmic resistance or the like of the electrolyte electrode assembly should be small, whereas the conductance (reciprocal of the resistance value) should be high. For example, it has been attempted to decrease the thickness of a solid electrolyte membrane or an ion exchange membrane in order to improve conductance, in the case that an electrolyte supported type of electrolyte electrode assembly or cell (ESC) is used, in which the solid electrolyte membrane is initially manufactured, and the solid electrolyte membrane is used as a substrate wherein an anode or a cathode is provided on each of the end surfaces thereof.

However, in this case, the strength of the solid electrolyte membrane is small. Therefore, it is feared that the electrolyte electrode assembly may be destroyed if high stresses are applied to the SOFC. For this reason, typically, the thickness of the solid electrolyte in the ESC is not less than 200 μm in order to ensure sufficient strength. As described above, in the case of an ESC, an improvement in conductance while maintaining sufficient strength of the ESC are in a so-called trade-off relationship, wherein it is difficult to establish both improved conductance and sufficient strength.

In view of the above, Japanese Laid-Open Patent Publication No. 2003-346842 suggests a reinforcing rib, which is provided for a thin plate-shaped solid electrolyte membrane. That is, it has been attempted to reduce the ohmic resistance of the solid electrolyte layer by forming the solid electrolyte membrane as a thin plate, whereas the strength of the electrolyte electrode assembly is ensured by means of the reinforcing rib.

DISCLOSURE OF THE INVENTION

As described above, the thickness of the solid electrolyte is generally decreased in order to improve the conductance of the electrolyte electrode assembly. However, factors that decrease conductance are not limited to the ohmic resistance of the solid electrolyte. There are also many other factors including, for example, interface resistance between the solid electrolyte and the cathode. Therefore, when only thickness of the solid electrolyte is decreased, the attained conductance may be lower than its expected value in some cases. Further, in such a situation, the strength of the electrolyte electrode assembly decreases.

In Patent Document 1, the thickness of the electrolyte membrane is not described specifically. Therefore, the actual conductance of the electrolyte electrode assembly described in Patent Document 1 is unclear.

A general object of the present invention is to provide an electrolyte electrode assembly, in which the conductance thereof is significantly improved.

A principal object of the present invention is to provide an electrolyte electrode assembly in which the strength of the electrolyte electrode assembly is ensured.

Another object of the present invention is to provide a method for producing an electrolyte electrode assembly as described above.

According to one aspect of the present invention, there is provided an electrolyte electrode assembly formed by an anode and a cathode with a solid electrolyte interposed therebetween, wherein:

a thick-walled portion, and a thin-walled portion having a thickness smaller than that of the thick-walled portion, are provided on at least one of an end surface of the solid electrolyte disposed on a side facing the anode and an end surface disposed on a side facing the cathode;

the thickness of the thick-walled portion is greater than respective thicknesses of the anode and the cathode; and a calculated value of conductance per unit area is 2 to 30 $S/cm^2$.

In the electrolyte electrode assembly, strength is ensured by the thick-walled portion. Further, conductance is increased owing to the presence of the thin-walled portion, which has a small wall thickness. Accordingly, it is possible to construct an electrolyte electrode assembly, which has excellent strength and which exhibits sufficient conductance.

Owing to the fact that the calculated value of conductance per unit area is within the range of 2 to 30 $S/cm^2$, the efficiency of the cell provided with the electrolyte electrode assembly, for example an SOFC, is ensured, along with ensuring sufficient strength thereof.

That is, a calculated value of conductance per unit area is defined in the present invention, and thus it is possible to construct an electrolyte electrode assembly, which possesses excellent efficiency and is easily manufactured.

It is preferable that a ratio of an area occupied by the thin-walled portion in the solid electrolyte is within 90% of a surface area of the solid electrolyte. If the provided thin-walled portion exceeds 90% of the surface area, the strength of the solid electrolyte is decreased.

The surface area of the solid electrolyte herein is calculated from the planar dimensions thereof, assuming that the thin-walled portion is absent. For example, when the shape of the solid electrolyte is square or rectangular, it is appropriate to calculate the surface area as (longitudinal dimension)×(latitudinal dimension). When the shape of the solid electrolyte is circular, it is appropriate to calculate the surface area as (radius)×(radius)×(ratio of the circumference of a circle to its diameter). The area, or the areal size, of the thin-walled portion also is calculated from the planar dimensions, in the same manner as with the surface area of the solid electrolyte.

The thickness of the thick-walled portion may be defined to be, for example, 60 to 500 μm. If the thick-walled portion is less than 60 μm, sufficient strength of the solid electrolyte cannot be easily ensured. Further, it becomes difficult to manufacture the solid electrolyte. On the other hand, if the thickness exceeds 500 μm, then the processing amount is increased, and conductance cannot easily be improved. Therefore, sufficient power generation efficiency cannot be obtained.

The thickness of the thin-walled portion can be made 5 μm at a minimum.

The position where the thin-walled portion is formed is not especially limited. However, it is preferable for the thin-walled portion to be provided on an end surface, disposed on a side facing the anode. With such an arrangement, the anode may be formed so that a flat surface thereof is provided after all of the thin-walled portions have been filled. Alternatively, the anode may be formed so that any recesses thereof are provided corresponding to the thin-walled portion. In such a case, a depression is also formed for the anode. Therefore, any streams or water vapor that may be generated on the anode can be discharged with ease. Further, since the electrode area of the anode is increased, the contact area is increased with respect to the fuel gas. Therefore, reaction efficiency is improved.

In some situations, it is also appropriate for an intermediate layer to be provided between the solid electrolyte and at least one of the cathode and the anode. In this arrangement, the intermediate layer functions as a reaction-preventive layer. Therefore, it is possible to avoid reactions between the solid electrolyte and the electrode, which might otherwise be caused, for example, when the electrolyte electrode assembly is manufactured.

According to another aspect of the present invention, there is provided a method for producing an electrolyte electrode assembly formed by an anode and a cathode with a solid electrolyte interposed therebetween, comprising the steps of:

manufacturing the solid electrolyte by compressing and forming a powder material to be formed into the solid electrolyte;

providing a thin-walled portion by depressing at least one end surface of the solid electrolyte while allowing a residual portion to remain as a thick-walled portion, followed by calcination, or by depressing at least one end surface of the solid electrolyte after calcining the solid electrolyte while allowing a residual portion to remain as the thick-walled portion; and providing the anode, having a thickness smaller than that of the thick-walled portion, on the one end surface of the solid electrolyte, while providing the cathode, having a thickness smaller than that of the thick-walled portion, on another end surface of the solid electrolyte, wherein the material of the solid electrolyte, the thickness of the thick-walled portion, a thickness of the thin-walled portion, and the materials and the thicknesses of the anode and the cathode are defined such that a calculated value of conductance per unit area of the electrolyte electrode assembly is 2 to 30 S/cm$^2$.

In this way, an ESC can be manufactured with ease, which is provided with a solid electrolyte having the thin-walled portion and the thick-walled portion therein.

The solid electrolyte can also be manufactured initially from a sheet member. That is, according to still another aspect of the present invention, there is provided a method for producing an electrolyte electrode assembly formed by an anode and a cathode with a solid electrolyte interposed therebetween, comprising the steps of:

manufacturing a sheet member by forming, into a sheet-shaped form, a powder material to be formed into the solid electrolyte;

providing the solid electrolyte by stacking a plurality of the sheet members and performing a pressure-joining and forming process on the sheet members;

calcining the solid electrolyte; and providing the anode, having a thickness smaller than that of a thick-walled portion, on one end surface of the solid electrolyte, while providing the cathode, having a thickness smaller than that of the thick-walled portion, on another end surface of the solid electrolyte, wherein a thin-walled portion is provided by depressing one end surface of at least one of the sheet members, or depressing at least one end surface of the solid electrolyte, with a residual portion thereof forming the thick-walled portion, followed by calcination, and wherein the material of the solid electrolyte, the thickness of the thick-walled portion, a thickness of the thin-walled portion, and the materials and the thicknesses of the anode and the cathode are defined such that a calculated value of conductance per unit area of the electrolyte electrode assembly is 2 to 30 S/cm$^2$.

The solid electrolyte having the thin-walled portion and the thick-walled portion therein can be manufactured by providing the depression in the sheet member or in the solid electrolyte, and then calcining it as described above.

Even when a sheet member is used, the depression (thin-walled portion) may be provided after calcining the solid electrolyte. That is, according to still another aspect of the present invention, there is provided a method for producing an electrolyte electrode assembly formed by an anode and a cathode with a solid electrolyte interposed therebetween, comprising:

manufacturing a sheet member by forming, into a sheet-shaped form, a powder material to be formed into the solid electrolyte;

providing the solid electrolyte by stacking a plurality of the sheet members and performing a pressure-joining and forming process on the sheet members;

calcining the solid electrolyte; and providing the anode, having a thickness smaller than that of a thick-walled portion, on one end surface of the solid electrolyte, while providing the cathode, having a thickness smaller than that of the thick-walled portion, on another end surface of the solid electrolyte, wherein a thin-walled portion is provided by depressing at least one end surface of the solid electrolyte after calcination, while allowing a residual portion to remain as the thick-walled portion, and wherein the material of the solid electrolyte, the thickness of the thick-walled portion, a thickness of the thin-walled portion, and the materials and the thicknesses of the anode and the cathode are defined such that a calculated value of conductance per unit area of the electrolyte electrode assembly is 2 to 30 S/cm$^2$.

In the production method described above, the thin-walled portion is formed, for example, by means of machining. However, the thin-walled portion may also be formed using a pore-forming agent or a hole-forming agent. That is, according to still another aspect of the present invention, there is provided a method for producing an electrolyte electrode assembly formed by an anode and a cathode with a solid electrolyte interposed therebetween, comprising the steps of:

manufacturing the solid electrolyte by performing a compressing and forming process, after embedding a pore-forming agent into at least one end surface of a powder material to be formed into the solid electrolyte;

calcining the solid electrolyte to cause the pore-forming agent to disappear, so that a thin-walled portion is provided while allowing a residual portion to remain as a thick-walled portion; and providing the anode, having a thickness smaller than that of the thick-walled portion, on one end surface of the solid electrolyte, while providing the cathode, having a thickness smaller than that of the thick-walled portion, on another end surface of the solid electrolyte, wherein the material of the solid electrolyte, the thickness of the thick-walled portion, a thickness of the thin-walled portion, and the materials and the thicknesses of the anode and the cathode are defined such that a calculated value of conductance per unit area of the electrolyte electrode assembly is 2 to 30 S/cm$^2$.

Further, the solid electrolyte may be manufactured using a sheet member, in the same manner as described above. That is, according to still another aspect of the present invention, there is provided a method for producing an electrolyte electrode assembly formed by an anode and a cathode with a solid electrolyte interposed therebetween, comprising the steps of:

manufacturing a sheet member by forming, into a sheet-shaped form, a powder material to be formed into the solid electrolyte;

providing the solid electrolyte by stacking a plurality of the sheet members and performing a pressure-joining and forming process on the sheet members;

calcining the solid electrolyte; and providing the anode, having a thickness smaller than that of a thick-walled portion, on one end surface of the solid electrolyte, while providing the cathode, having a thickness smaller than that of the thick-walled portion, on another end surface of the solid electrolyte, wherein a pore-forming agent is added to at least one of the sheet members to be calcined, and wherein the material of the solid electrolyte, the thickness of the thick-walled portion, a thickness of a thin-walled portion, and the materials and the thicknesses of the anode and the cathode are defined such that a calculated value of conductance per unit area of the electrolyte electrode assembly is 2 to 30 S/cm$^2$.

The pore-forming agent may be made of carbon or resin. Such a pore-forming agent is removed through burning, by means of heating. Pores or holes remain at portions where the pore-forming agent has been removed. The thin-walled portion can also be provided, as a result of providing holes as described above.

When a pore-forming agent is used, it is unnecessary to perform machining in order to create the depression. Therefore, a solid electrolyte, having a thin-walled portion and a thick-walled portion, can be manufactured efficiently.

According to the present invention, a thick-walled portion and a thin-walled portion are provided for the solid electrolyte constituting the electrolyte electrode assembly, whereby strength is ensured due to the thick-walled portion, whereas conductance is improved as a result of the thin-walled portion. Therefore, an electrolyte electrode assembly can be constructed having excellent strength, and which exhibits sufficient conductance.

A predetermined conductance per unit area is established for the electrolyte electrode assembly. Therefore, it is possible to avoid the conductance becoming lower than its expected value, which might otherwise be caused when the electrolyte electrode assembly is manufactured considering only the conductance per unit area of the electrolyte.

BEST MODE FOR CARRYING OUT THE INVENTION

An electrolyte electrode assembly, and a method for producing the same according to the present invention, shall be explained in detail below, exemplified by preferred embodiments, with reference to the accompanying drawings.

Figure 1:
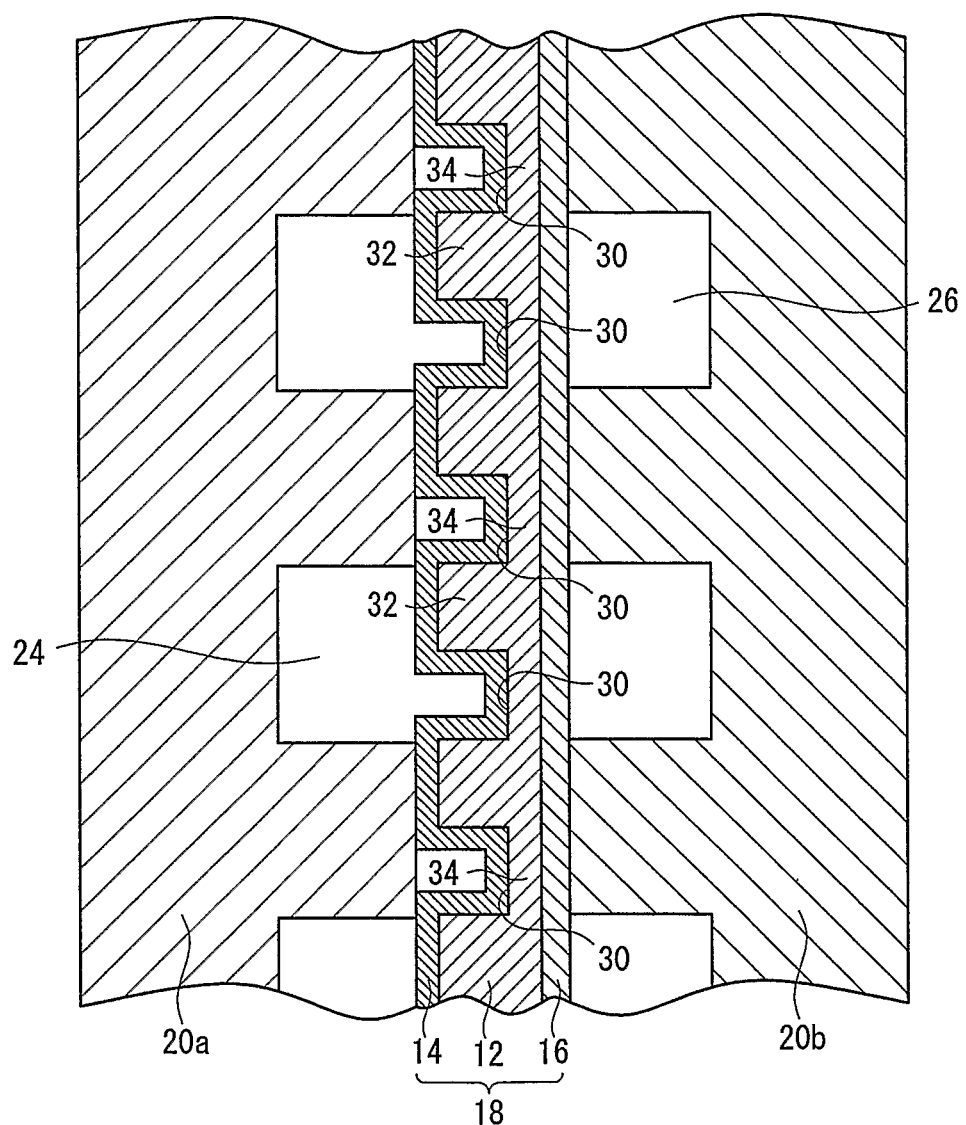
FIG. 1 is a schematic vertical sectional view illustrating principal components of a unit cell of a SOFC, provided with an electrolyte electrode assembly according to an embodiment of the present invention.

FIG. 1 is a schematic vertical sectional view illustrating principal components of a unit cell 10 making up a SOFC. The unit cell 10 is constructed such that an electrolyte electrode assembly 18, constructed by arranging a solid electrolyte 12 composed of an oxide ion ($O^{2-}$) conductor between an anode 14 and a cathode 16, is interposed between a pair of separators 20a, 20b.

A plurality of first grooves 24 and second grooves 26, which are depressed so as to separate away from the anode 14 or the cathode 16, are formed respectively on the separators 20a and 20b. The first grooves 24 are utilized as flow passages for supplying a fuel gas to the anode 14, while the second grooves 26 are utilized as flow passages for supplying an oxygen-containing gas to the cathode 16.

Figure 2:
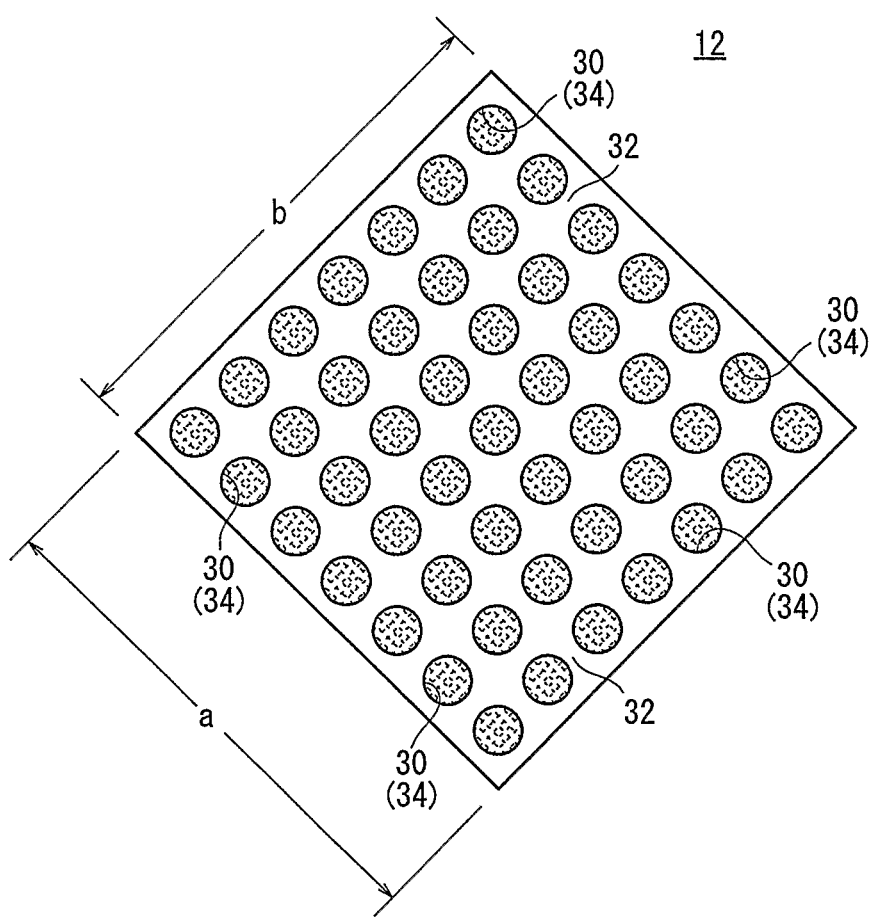
FIG. 2 is a plan view illustrating a solid electrolyte constituting the electrolyte electrode assembly shown in FIG. 1.

FIG. 2 is a plan view illustrating an end surface of the solid electrolyte 12, disposed on a side facing the anode 14. As clearly appreciated from FIGS. 1 and 2, a plurality of columnar recesses 30 are formed, in a depressed configuration, on the end surface. Therefore, the solid electrolyte 12 is provided with a thick-walled portion 32, which extends from one abutment surface with respect to the anode 14 to another abutment surface with respect to the cathode 16. The solid electrolyte 12 also is provided with thin-walled portions 34, which extend from the abutment surface with respect to the cathode 16 to the columnar recesses 30, and which have a thickness smaller than that of the thick-walled portion 32.

The thickness of the thick-walled portion 32 is set to correspond with the general thickness of the solid electrolyte of the ESC, specifically 60 to 500 μm. A solid electrolyte, in which the thickness of the thick-walled portion 32 is less than 60 μm, cannot easily be manufactured. Conversely, if the thickness of the thick-walled portion 32 exceeds 500 μm, then the thin-walled portion 34 cannot easily be provided, and moreover conductance cannot easily be improved in order to obtain sufficient power generation efficiency.

On the other hand, it is sufficient for the thickness of the thin-walled portion 34 to be smaller than that of the thick-walled portion 32. Also, the thickness of the thin-walled portion 34 may be 5 μm at a minimum.

It is preferable that the area occupied by the thin-walled portions 34 is within 90% of the surface area of the solid electrolyte 12. In this case, the surface area of the solid electrolyte 12 is expressed by a value calculated from (longitudinal dimension a)×(latitudinal dimension b), as shown in FIG. 2, i.e., a value calculated based on the planar dimension thereof.

The area, or areal size, of the thin-walled portions 34 is also appropriately calculated on the basis of the planar dimension thereof. That is, the value of the radius r of the columnar recess 30 is measured, as shown in FIG. 2. The value of the (radius r)×(radius r)×(ratio of the circumference of the circle to its diameter a) is calculated, which then is multiplied by the number of columnar recesses 30. It is preferable for the ratio of area occupied by the thin-walled portions, determined by the following expression (1), not to be more than 90%.

Ratio of area occupied by thin-walled portions={n× (radius r×radius r×ratio of the circumference of the circle to its diameter π)/(longitudinal dimension a×latitudinal dimension b)}×100     (1)

In the above expression, n represents the number of the columnar recesses 30.

When the solid electrolyte and/or the thin-walled portion has any other shape, a calculation is appropriately performed on the basis of the planar dimension thereof. For example, if the solid electrolyte 36 has a circular shape, as shown in FIGS. 3 to 6, it is appropriate to calculate the value of the planar dimension as (radius)×(radius)×(ratio of the circumference of the circle to its diameter).

The thickness of the thick-walled portion 32 is set so as to be larger than that of the anode 14 and the cathode 16. That is, the electrolyte electrode assembly 18 is formed as an ESC, wherein the solid electrolyte 12 is manufactured initially, and then the anode 14 and the cathode 16 are disposed on respective end surfaces of the solid electrolyte 12, as described later on.

As for the material making up the solid electrolyte 12, materials that hitherto have been used as SOFC solid electrolytes may be selected. Specifically, for example, materials may be selected from among stabilized zirconia, lanthanum gallate-based composite oxide, and cerium oxide doped with yttrium oxide (YDC).

In the present embodiment, the anode 14 is formed on both the thick-walled portion 32 and the thin-walled portions 34. Therefore, the anode 14 has a form in which the anode 14 is depressed at portions corresponding to the thin-walled portions 34 (columnar recesses 30) of the solid electrolyte 12.

In the electrolyte electrode assembly 18, which is constructed as described above, the calculated value of conductance per unit area is set to 2 to 30 S/cm². If the calculated value is less than 2 S/cm², the efficiency of the electrolyte electrode assembly 18, which is determined from the amount of fuel gas and the amount of oxygen-containing gas supplied to the SOFC, is lower than 30%. On the other hand, if the calculated value exceeds 30 S/cm², portions occupied by the thin-walled portions 34 are increased excessively, and thus, there is a tendency for the strength of the solid electrolyte 12, as well as the strength of the electrolyte electrode assembly 18, to be lowered. More preferably, the calculated value of conductance per unit area of the electrolyte electrode assembly 18 should be within a range of 5 to 25 S/cm².

The conductance per unit area of the electrolyte electrode assembly 18 is generally calculated and determined as follows.

Conductance per unit area=conductance/area     (2)

The conductance equals the reciprocal of the resistance, and hence the following expression (3) holds.

Conductance=1/resistance     (3)

Therefore, the conductance per unit area of the electrolyte electrode assembly 18 can be determined by the following expression (4).

Conductance per unit area=1/(resistance×area)     (4)

In this embodiment, when the solid electrolyte 12, the anode 14, the cathode 16, and the intermediate layer 50 (to be described later) are present, it is assumed that the electrolyte electrode assembly 18 is constructed, which includes the intermediate layer 50. That is, the conductance of the electrolyte electrode assembly 18 is calculated taking into consideration the resistances of the respective layers 12, 14, 16 and 50 making up the electrolyte electrode assembly 18. In this case, the resistance of the electrolyte electrode assembly 18 is the sum total of the resistances of the respective layers 12, 14, 16 and 50. Therefore, the aforementioned expression (4) can be transformed into the following expression (5).

Conductance per unit area of the electrolyte electrode assembly 18=1/(sum total of resistances of the respective layers making up the electrolyte electrode assembly 18×area of electrolyte 12)= 1/{(resistance of electrolyte 12+resistance of anode 14+resistance of cathode 16+resistance of intermediate layer 50)×area of electrolyte 12}     (5)

With respect to the resistances of the respective layers in expression (5), for example, in the case of the solid electrolyte 12, the resistance is determined by the following expression (6).

Resistance of solid electrolyte 12=thickness of solid electrolyte 12/(electrical conductivity of solid electrolyte 12×surface area of solid electrolyte 12)     (6)

The thin-walled portions 34 and the thick-walled portion 32 are present within the solid electrolyte 12. Therefore, it is necessary to consider the ratio of the area occupied by the thin-walled portions, in relation to the conductance per unit area of the solid electrolyte 12. In particular, because the thickness differs between the thin-walled portions 34 and the thick-walled portion 32, the resistance differs therebetween. That is, in the case of the solid electrolyte 12, the resistance of the solid electrolyte 12 is determined by the sum of the resistances of each of the thin-walled portions 34 together with the resistance of the entire thick-walled portion 32. In other words, the following expression (7) holds.

Resistance of solid electrolyte 12=resistance of all of the thin-walled portions 34+resistance of entire thick-walled portion 32={(thickness of the thin-walled portions 34×ratio of area occupied by the thin-walled portions×0.01)/(electrical conductivity of the solid electrolyte 12×surface area of the solid electrolyte 12)}+{(thickness of the thick-walled portion 32×ratio of area occupied by the thick-walled portion×0.01)/(electrical conductivity of the solid electrolyte 12×surface area of the solid electrolyte 12)} (7)

According to expression (7), it is possible to determine the resistance of the solid electrolyte 12 having both the thin-walled portions 34 and the thick-walled portion 32. The respective resistances of the remaining anode 14, the cathode 16, and the intermediate layer 50 may be determined in the same manner as described above, wherein the conductance is determined from the resistances, in accordance with the above-described expression (5).

For example, in the case of a solid electrolyte 12, which is composed of stabilized zirconia (SCSZ) doped with $Sc_2O_3$, having an electrical conductivity of 0.0682 S/cm and a surface area based on a planar dimension of 10 $cm^2$, when the thin-walled portions 34 having a thickness of 100 µm and the thick-walled portion 32 having a thickness of 200 µm are present, and wherein the ratio of the area occupied by the thin-walled portions is 80%, then the respective resistances of the thin-walled portions 34 and the thick-walled portion 32, each of which is obtained by dividing the thickness by the electrical conductivity in order to obtain an area resistivity or sheet resistivity, which is further divided by the area, are 14.7 mΩ and 29.3 mΩ respectively. Therefore, the theoretical resistance of the solid electrolyte 12 is determined as follows.

$$14.7 \times 0.8 + 29.3 \times (1-0.8) = 17.62 \text{ [m}\Omega\text{]}$$

The theoretical conductance is the reciprocal of the theoretical resistance. Therefore, the theoretical conductance is $1/(17.62 \times 10^{-3}) = 56.75$ S. As described above, the surface area of the solid electrolyte 12 is 10 $cm^2$. Therefore, the conductance per unit area is 5.675 $S/cm^2$. Hence, when the thin-walled portions 34 are provided as described above, the conductance of the solid electrolyte 12 can be improved.

The resistance of the electrolyte electrode assembly 18 is determined by further adding, to this value, the material resistance of the anode 14, the material resistance of the cathode 16, and the material resistance of the intermediate layer 50, as shown in expression (5). As a result, the theoretical conductance per unit area of the electrolyte electrode assembly 18 is determined.

It goes without saying, when the intermediate layer 50 is absent as shown in FIG. 1, it is unnecessary even to consider the material resistance as well as the conductance of the intermediate layer 50. It is a matter of course that when any layer other than the intermediate layer 50 is present, the material resistance as well as the conductance of the concerned layer should be considered.

That is, in the present embodiment, the conductance of the entire electrolyte electrode assembly 18 is defined so as to include the conductance of the anode 14 and the cathode 16, and not only the conductance of the solid electrolyte 12. The conductance may also be defined to include, for example, the interface resistance between the respective layers, and the contact resistance with respect to the separators 20a, 20b. Therefore, it is possible to avoid a situation in which the conductance of the electrolyte electrode assembly has a lower than expected value after providing the electrolyte electrode assembly, while considering only the conductance of the solid electrolyte 12. Consequently, it is possible to ensure a sufficient power generation characteristic for the SOFC.

Further, in the embodiment of the present invention, owing to the presence of the thick-walled portion 32, the electrolyte electrode assembly 18 possesses sufficient strength. Consequently, according to the embodiment of the present invention, an electrolyte electrode assembly 18 can be constructed having excellent strength, and moreover, which exhibits a conductance sufficient to facilitate the power generation reaction.

The SOFC is constructed by stacking a predetermined number of unit cells 10, each of which is constructed as described above. A fuel gas (for example, a hydrogen-containing gas) flows through the first grooves 24, and an oxygen-containing gas (for example, air) flows through the second grooves 26, whereby the operation is initiated.

During this operation, a reaction occurs on the cathode 16 between the electrons arriving at the cathode 16 via the separator 20b and oxygen contained within the oxygen-containing gas. As a result, oxide ions ($O^{2-}$) are generated. The oxide ions are conducted through the solid electrolyte 12 and arrive at the anode 14, which causes a reaction with hydrogen contained within the fuel gas and supplied to the anode 14. Accordingly, water (steam or water vapor) and electrons are generated. In particular, the electrons are utilized as electric energy, thereby energizing the external load electrically connected to the SOFC. Thereafter, the electrons arrive at the cathode 16 via the separator 20b.

During this process, according to the embodiment of the present invention, steam that is generated on the anode 14 can be discharged with ease, because depressions are provided on the anode 14 owing to the presence of the columnar recesses 30, i.e., the thin-walled portions 34, on the solid electrolyte 12 (see FIG. 1).

Further, the anode 14 also is formed on the bottom and side wall surfaces of the columnar recesses 30. Therefore, the electrode area of the anode 14 is increased, as compared to the case in which the anode 14 is formed on a solid electrolyte on which the columnar recesses 30 are not provided. Therefore, the contact area is increased between the anode 14 and the fuel gas. As a result, an advantage is obtained in that the reaction efficiency is improved.

In the electrolyte electrode assembly 18 shown in FIGS. 1 and 2, thin-walled portions 34 are provided by forming the columnar recesses 30 on an end surface, which is disposed on a side facing the anode 14. However, thin-walled portions 34 may also be provided by forming the columnar recesses 30 on an end surface, which is disposed on a side facing the cathode 16. Alternatively, the thin-walled portions 34 may be provided by forming the columnar recesses 30 on both end surfaces, disposed on sides facing the anode 14 and the cathode 16 respectively.

Figure 3:
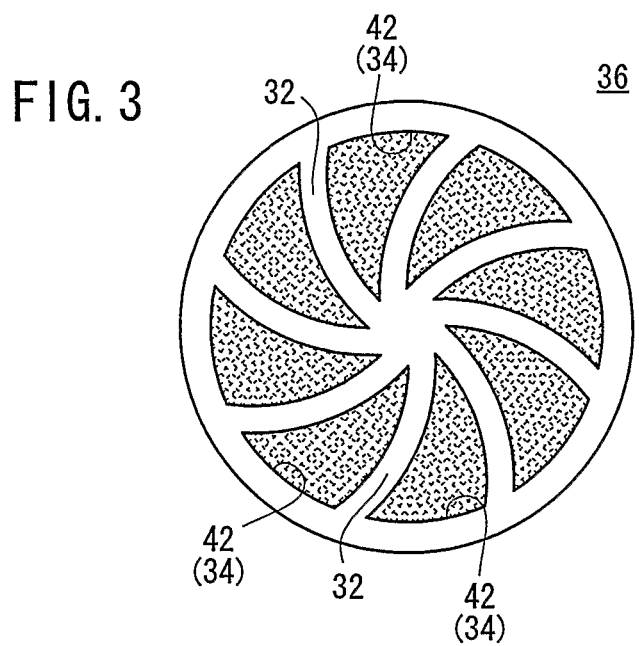
FIG. 3 is a plan view illustrating another solid electrolyte.
Figure 4:
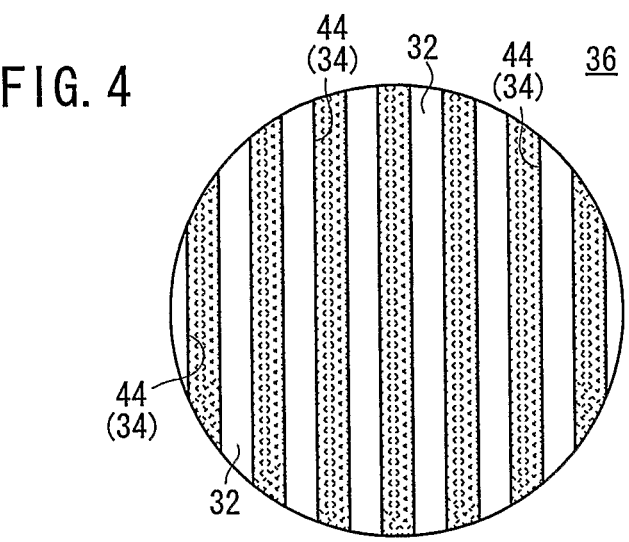
FIG. 4 is a plan view illustrating still another solid electrolyte.
Figure 5:
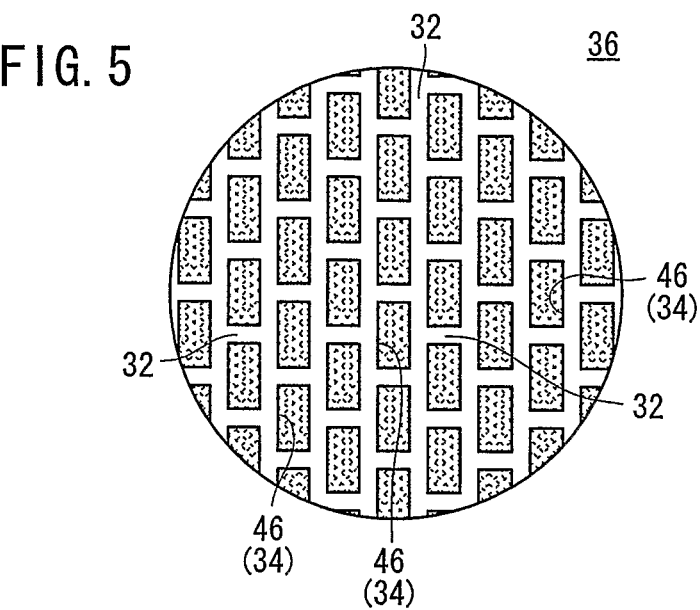
FIG. 5 is a plan view illustrating still another solid electrolyte.
Figure 6:
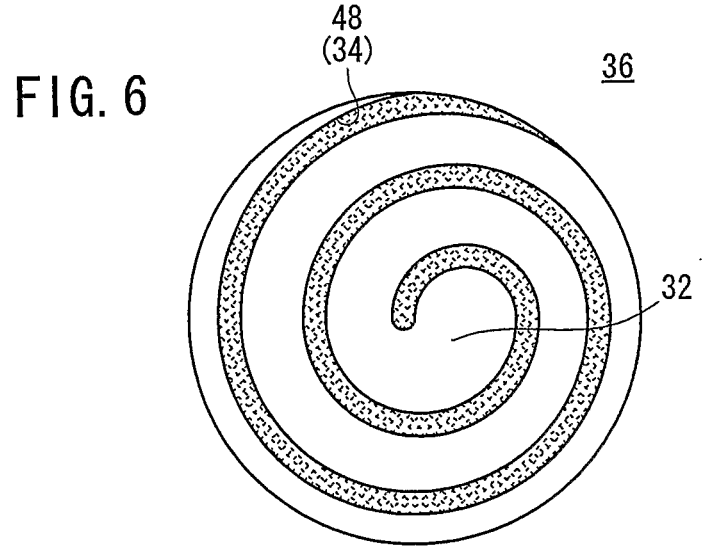
FIG. 6 is a plan view illustrating still another solid electrolyte.

The shapes of the thin-walled portions 34 are not limited to being columnar recesses 30. As shown in FIG. 3, a plurality of recesses 42 may be provided in a radial form. As shown in FIGS. 4 to 6, it is also possible to provide, for example, linear grooves 44, rectangular depressions 46, as well as a spiral groove 48.

Figure 7:
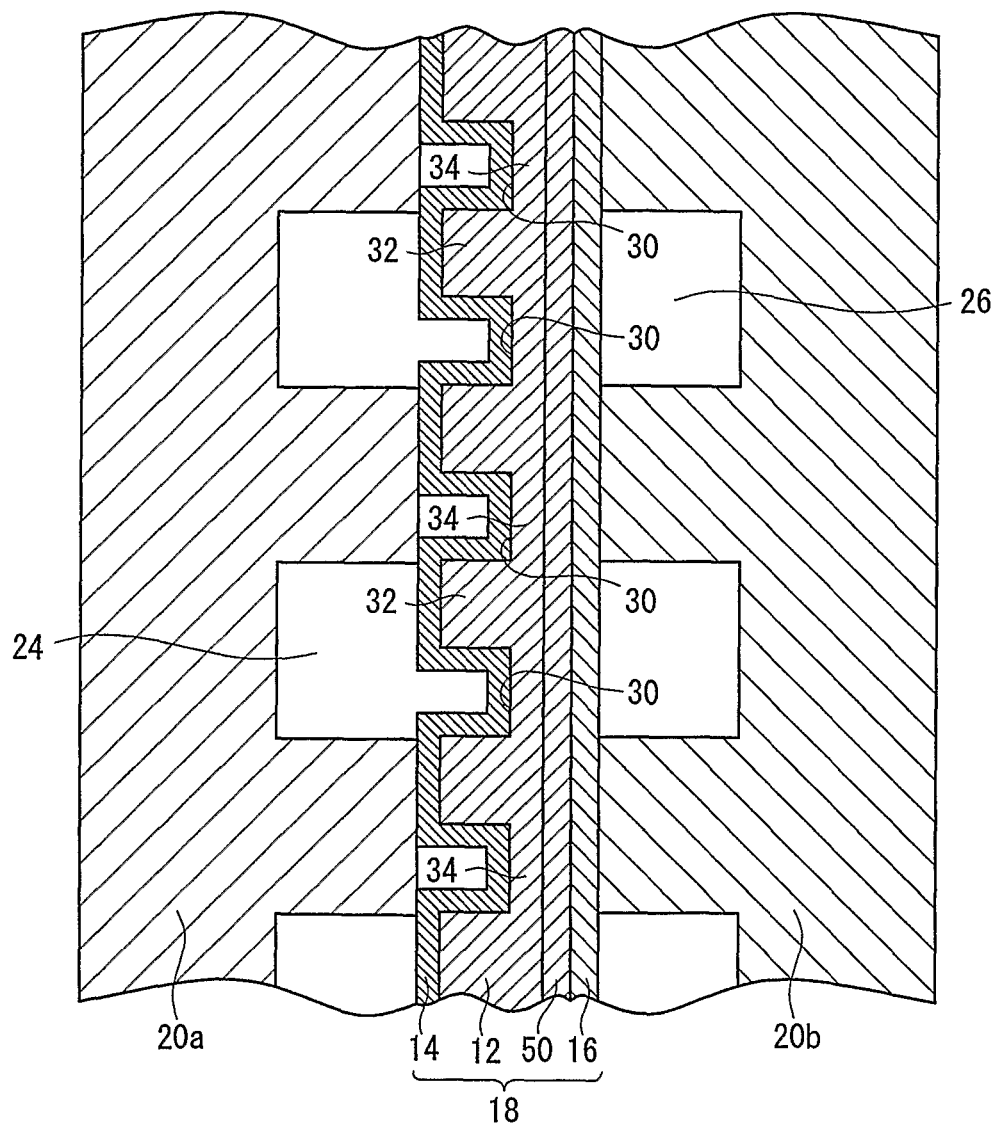
FIG. 7 is a schematic vertical sectional view illustrating principal components of a unit cell of a SOFC, provided with an intermediate layer.

Both the solid electrolyte 12 and the cathode 16 react with each other in certain cases, during production of the electrolyte electrode assembly 18, depending on, for example, the materials utilized for the solid electrolyte 12 and the cathode 16. In order to avoid this inconvenience, as shown in FIG. 7, an intermediate layer 50, which functions as a reaction-preventive layer, may be provided between the solid electrolyte 12 and the cathode 16. Naturally, the intermediate layer 50 may also be provided between the solid electrolyte 12 and the anode 14. The intermediate layers 50 may also be provided between both the solid electrolyte 12 and the anode 14, as well as between the solid electrolyte 12 and the cathode 16, respectively. In any of these cases, the material resistance of the intermediate layer 50 is added to the material resistance of the electrolyte electrode assembly 18, as described above.

The electrolyte electrode assembly 18, constructed as described above, can be produced, for example, according to any of the following first through third production methods.

Figure 8:
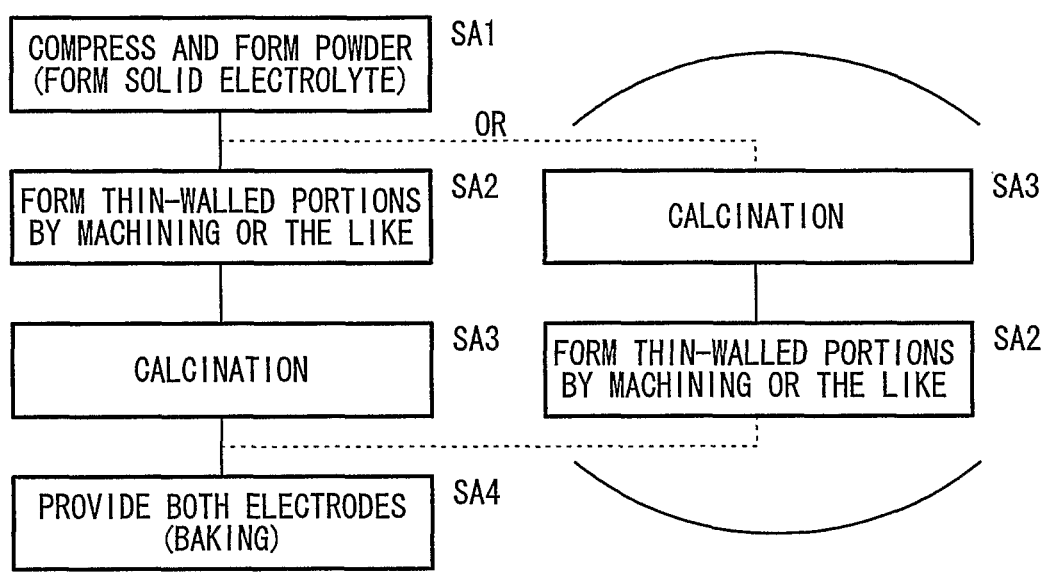
FIG. 8 is a flow chart of a first production method.

As shown in the flow chart of FIG. 8, the first production method includes a first step SA1 of manufacturing the solid electrolyte 12, a second step SA2 of providing thin-walled portions 34 on the solid electrolyte 12, a third step SA3 of calcining the solid electrolyte 12 on which the thin-walled portions 34 have been formed, and a fourth step SA4 of providing an anode 14 and a cathode 16 on respective end surfaces of the solid electrolyte 12.

Initially, in the first step SA1, a material to be formed into the solid electrolyte, for example, stabilized zirconia, a composite oxide based on lanthanum gallate, or an YDC powder, is compressed and formed. Accordingly, the solid electrolyte 12 is formed as a substrate. As described above, the surface area, calculated on the basis of the planar dimension according to this procedure, is the surface area of the solid electrolyte 12, even after the thin-walled portions 34 have been provided. For the reason described above, it is preferable for the thickness of the solid electrolyte 12, after calcination, to be 60 to 500 μm.

Subsequently, in the second step SA2, at least one end surface of the solid electrolyte 12 is depressed to form columnar recesses 30 thereon. During this procedure, for example, it is appropriate for machining to be performed.

The portions where the columnar recesses 30 are formed in the depressed form make up respective thin-walled portions 34. As described above, the ratio of the area occupied by the thin-walled portions after calcination is preferably within 90%. Therefore, it is preferable that when the processing for forming the columnar recesses 30 (thin-walled portions 34) is completed, the ratio of the area occupied by the thin-walled portions after calcination does not exceed 90%. The thickness of the thin-walled portion 34 should be at least 5 μm after calcination. The portion on which processing is not applied, and hence where no thin-walled portions 34 have been provided, makes up the thick-walled portion 32.

Subsequently, in the third step SA3, the solid electrolyte 12 provided with the thin-walled portions 34 is calcined. As a result, a solid electrolyte 12 is manufactured, having characteristics of both high strength and high conductance.

Finally, in the fourth step SA4, an anode 14 is provided on one end surface of the solid electrolyte 12, whereas a cathode 16 is provided on the other end surface. During this process, so-called calcination or firing may be performed. Calcination is appropriately performed after applying the anode 14 on one end surface of the solid electrolyte 12, while the cathode 16 is applied on the other end surface by means of various application methods, including, for example, screen printing, pulse laser deposition (PLD), sputtering, thermal spraying, slurry coating, and electrophoresis. Alternatively, calcination may be performed on the anode 14 first, and then the cathode 16 is applied on the other end surface, followed by performing calcination of the cathode 16. In any case, the order of formation of the anode 14 and the cathode 16 can be reversed. If necessary, a step may be performed for providing an intermediate layer 50 between the solid electrolyte 12 and at least one of the anode 14 and the cathode 16.

Further, an intermediate layer 50 (see FIG. 7) may be provided on at least one end surface of the solid electrolyte 12, for example, on the end surface disposed on the side facing the cathode 16.

In the first production method, the order of the second and third steps SA2 and SA3 shown in FIG. 8 may be reversed. That is, the solid electrolyte 12 may be calcined (third step SA3), and thereafter, at least one end surface of the solid electrolyte 12 is depressed to form the thin-walled portions 34 therein (second step SA2).

Figure 9:
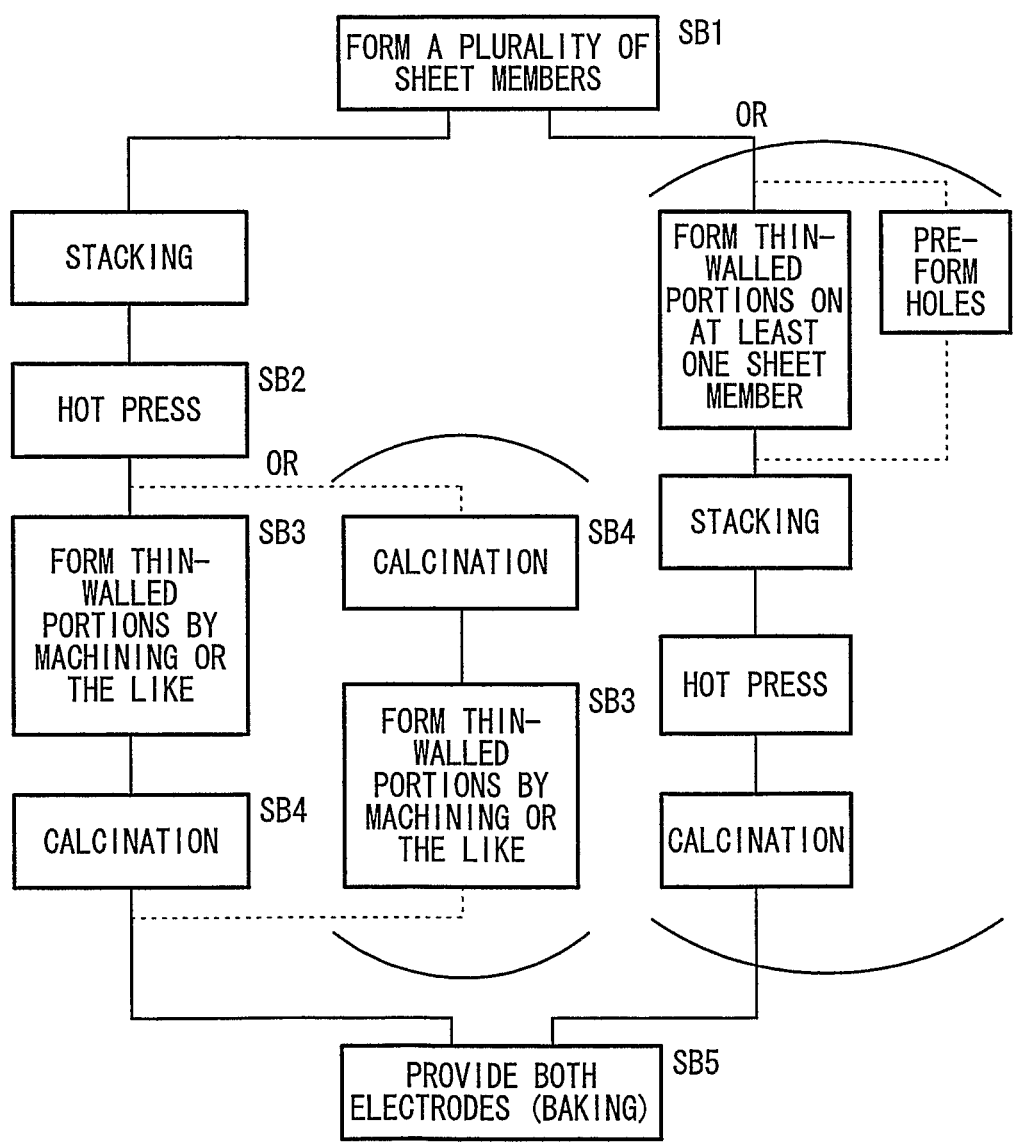
FIG. 9 is a flow chart of a second production method.

Next, a second production method shall be explained, with reference to the flow chart shown in FIG. 9. In the second production method, the solid electrolyte is formed starting from a sheet member.

That is, initially, during a first step SB1, the above-described powder is formed into a sheet-shaped form, wherein a plurality of such sheet members are manufactured. Subsequently, in a second step SB2, the plural sheet members are stacked together and a pressure-joining and forming process is conducted thereon, whereby the solid electrolyte 12 is provided. The pressure-joining and forming process includes, for example, utilizing a hot press, a normal temperature press, and a cold isostatic press (CIP).

Thereafter, the third through fifth steps SB3 to SB5 are carried out accordingly, in a manner similar to the second through fourth steps SA2 to SA4 performed in the first production method. That is, in the third step SB3, the thin-walled portions 34 are provided on the solid electrolyte 12, for example, by means of machining. In the fourth step SB4, the solid electrolyte 12 having the thin-walled portions 34 provided thereon is calcined. Finally, in the fifth step SB5, the anode 14 and the cathode 16 are provided on respective end surfaces of the solid electrolyte 12.

The second production method may also include the following procedure, in which an end surface of at least one of the sheet members is depressed, and the sheet members are then mutually stacked to provide the solid electrolyte 12. Further, the solid electrolyte 12 is calcined.

In a modified embodiment of the second production method, the order of the third step SB3 and the fourth step SB4 may be reversed.

In any case, a procedure, which is the same as or equivalent to the fourth step SA4 of the first production method, may be performed in the fifth step SB5, during the procedure for manufacturing the anode 14 and the cathode 16. Of course, if necessary, a step for providing an intermediate layer 50 between the solid electrolyte 12 and at least one of the anode 14 and the cathode 16 may also be performed.

Figure 10:
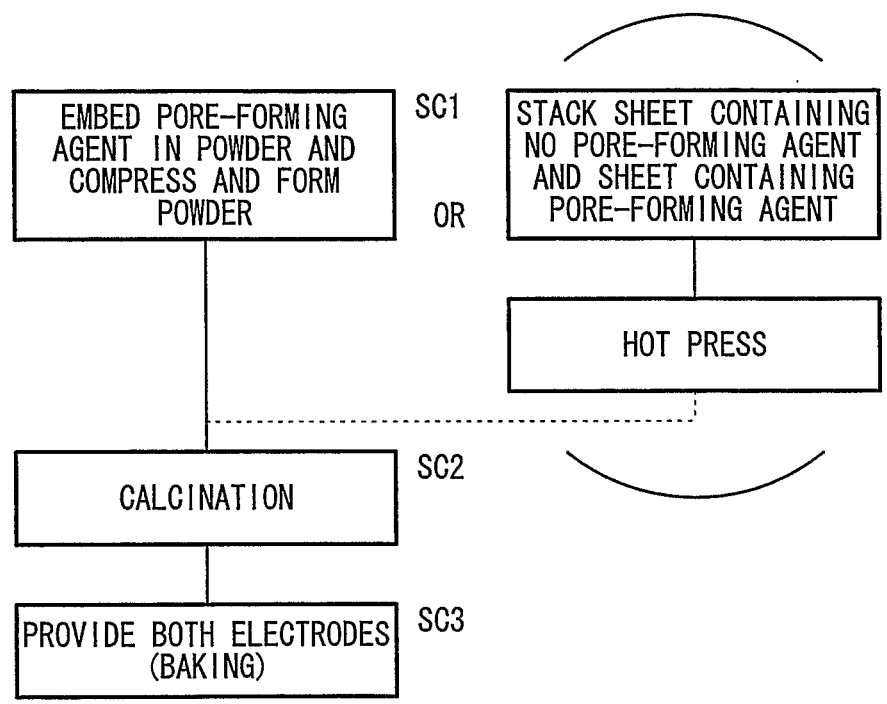
FIG. 10 is a flow chart of a third production method.

Next, the third production method shall be explained. As shown in the flow chart of FIG. 10, the third production method includes a first step SC1 for manufacturing the solid electrolyte 12, in which a pore-forming agent is embedded in at least one end surface, a second step SC2 of providing thin-walled portions 34 by causing the pore-forming agent to disappear by calcining the solid electrolyte 12, and a third step SC3 of providing the anode and cathodes 14, 16 on respective end surfaces of the solid electrolyte 12.

During this procedure, in the first step SC1, a cavity of the press-forming machine is filled with powder, which is to be formed into the solid electrolyte, and then a pore-forming agent is embedded in the upper end surface of the powder. Thereafter, a compressing and forming process is performed on the powder in order to form the solid electrolyte 12.

Subsequently, in the second step SC2, the solid electrolyte 12 is calcined. During this process, the pore-forming agent burns and is removed from the solid electrolyte 12. That is, holes are formed in the solid electrolyte 12 at portions where the pore-forming agent was present, thereby forming the thin-walled portions 34.

As described above, in the third production method, thin-walled portions 34 can be provided without performing machining or the like on the solid electrolyte 12. Therefore, the period of time required to perform such machining can be shortened. Consequently, the solid electrolyte 12, having thin-walled portions 34 and the thick-walled portion 32 therein, can be manufactured efficiently. Alternatively, thin-walled portions 34 may be provided by grinding the end surface, which is included among the end surfaces of the solid electrolyte 12, and which is disposed on a side opposite to the holes formed by the pore-forming agent. In such a procedure, the thickness of the thin-walled portion 34 can be made relatively small. Consequently, conductance can be increased.

When the holes are formed on both end surfaces of the solid electrolyte 12, preferably the following procedure is adopted. That is, in the first step SC1, the pore-forming agent is accommodated within a cavity of the press-forming machine, and then the powder, which is to be converted into the solid electrolyte 12, is charged into the press-forming machine. Further, the pore-forming agent becomes embedded within an exposed upper end surface of the powder.

In the third step SC3, the anode 14 and the cathode 16 are provided on the solid electrolyte 12, which includes the thin-walled portions 34 as described above. The third step SC3 preferably is performed in accordance with the fourth step SA4 of the first production method or the fifth step SB5 of the second production method. Of course, if necessary, a step may also be performed for providing an intermediate layer 50 between the solid electrolyte 12 and at least one of the anode 14 and the cathode 16.

The sheet member may be used as in the second production method, wherein the thin-walled portions 34 are provided by means of the pore-forming agent, as in the third production method. Alternatively, holes may be provided beforehand for the sheet member (see FIG. 10). According to this procedure, a sheet having a pore-forming agent added thereto, and the sheet without a pore-forming agent are stacked, whereupon the solid electrolyte 12 is provided by performing a pressure-joining and forming process, for example, using a hot press.

In any case, the respective thicknesses of the thick-walled portion 32 and the thin-walled portions 34 of the solid electrolyte 12, the ratio of the area occupied by the thin-walled portions (i.e., the number and areal size of various depressions, such as the columnar recesses 30), the thicknesses of the anode 14 and the cathode 16, as well as the materials forming the solid electrolyte 12, the anode 14 and the cathode 16, are appropriately defined such that the conductance of the electrolyte electrode assembly 18 lies within a range of 2 to 30 S/cm$^2$.

The electrolyte electrode assembly 18 is constructed as described above, wherein the electrolyte electrode assembly 18 is both excellent in terms of strength as well as providing sufficient conductance.

Figure 11:
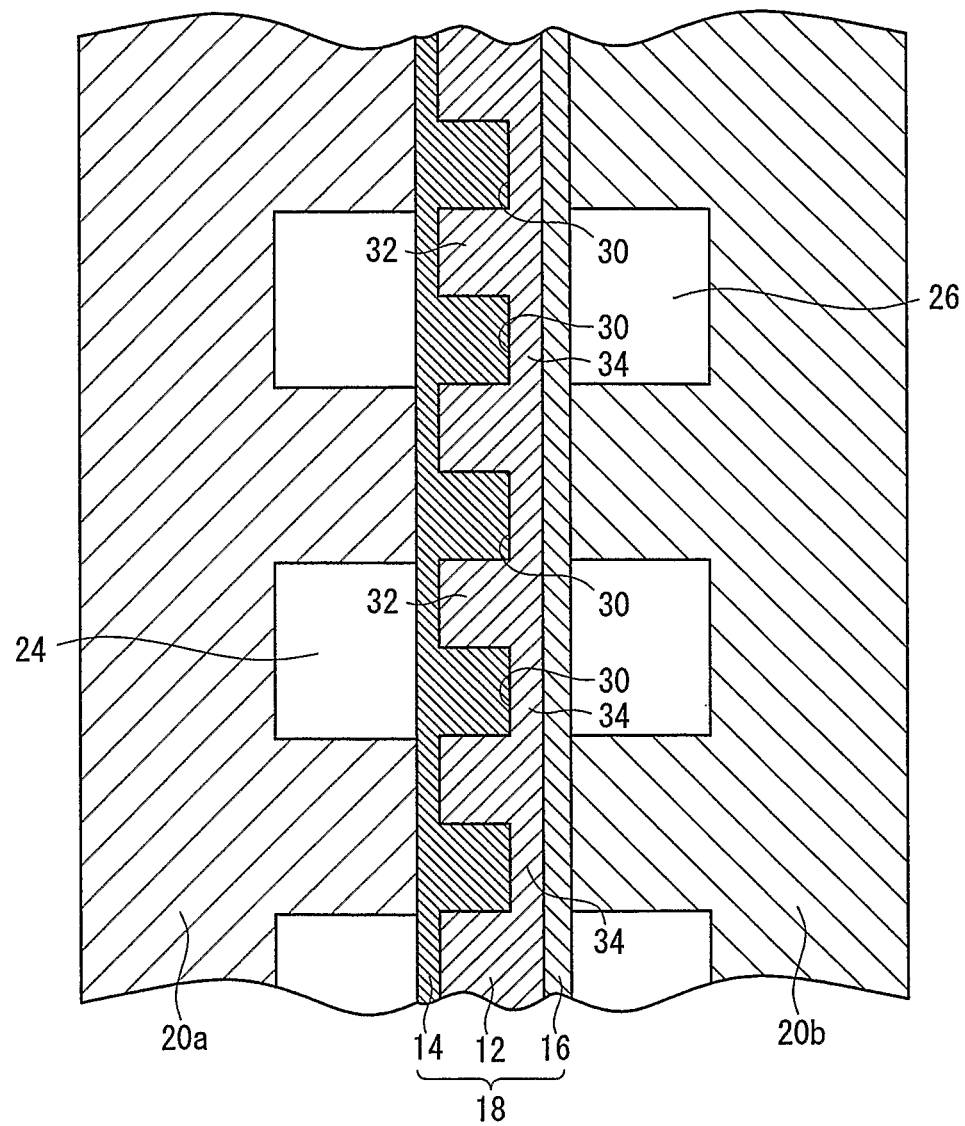
FIG. 11 is a schematic vertical sectional view illustrating principal components of a unit cell of a SOFC, provided with an electrolyte electrode assembly according to another embodiment.

In the embodiment described above, portions corresponding to the columnar recesses 30 of the anode 14 are depressed (see FIG. 1). However, as shown in FIG. 11, the depressions of the columnar recesses 30 may also be filled, thereby forming an anode 14, in which the surface thereof facing the separator 20a is flat. In this arrangement, the contact area between the anode 14 and the separator 20a is increased. Therefore, an advantage is obtained in that the electric power collection efficiency is increased.

Alternatively, columnar recesses 30 may be provided on an end surface of the solid electrolyte 12, disposed on a side thereof facing the cathode 16, wherein portions of the cathode 16, which correspond to the columnar recesses 30, are depressed. In this arrangement, the reaction field of the oxide ions is increased. Therefore, reaction efficiency is improved.

Figure 12:
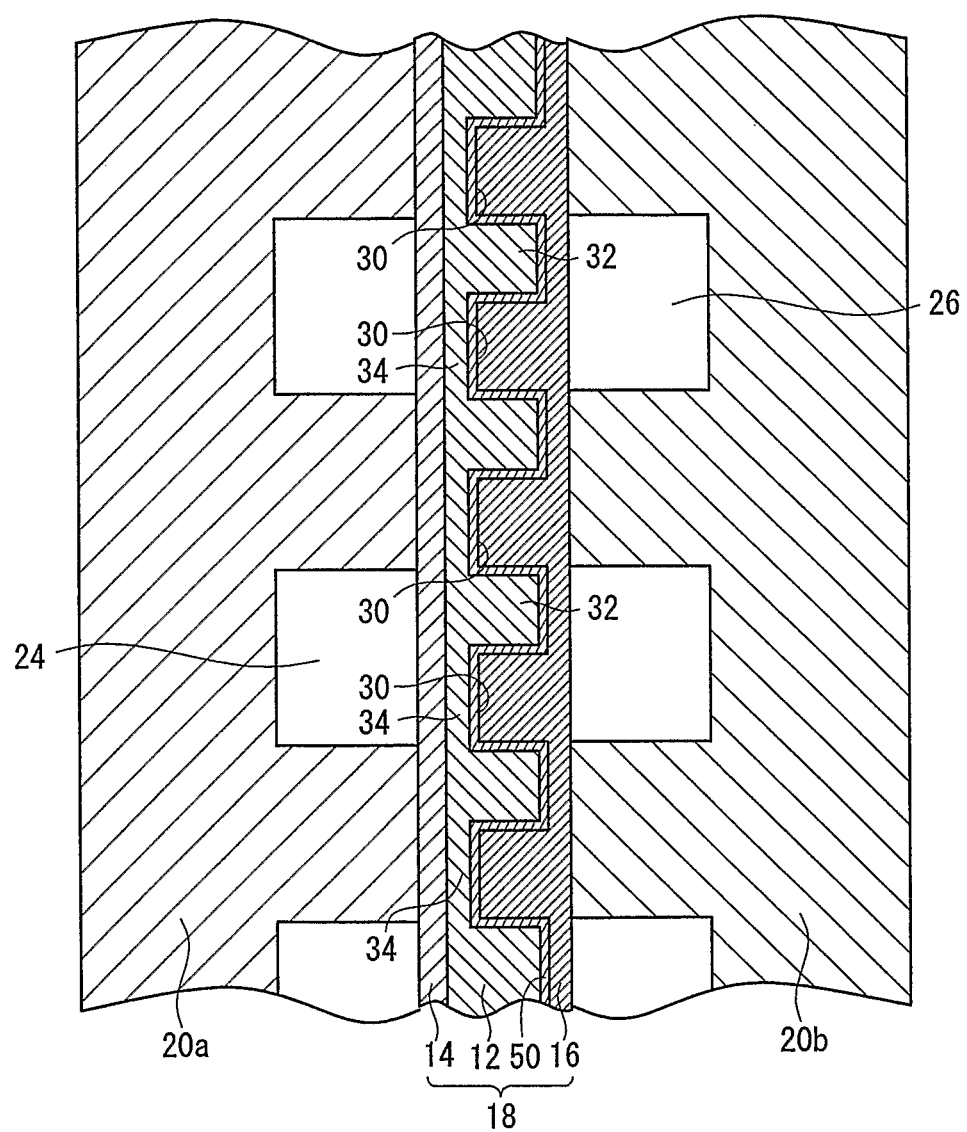
FIG. 12 is a schematic vertical sectional view illustrating principal components of a unit cell of a SOFC, provided with an electrolyte electrode assembly according to still another embodiment.

Further alternatively, as shown in FIG. 12, columnar recesses 30 and/or other depressions, which are provided on the end surface of the solid electrolyte 12 disposed on a side thereof facing the cathode 16, may be filled, whereby the cathode 16 is formed, in which the surface thereof facing the separator 20a is flat.

Figure 13:
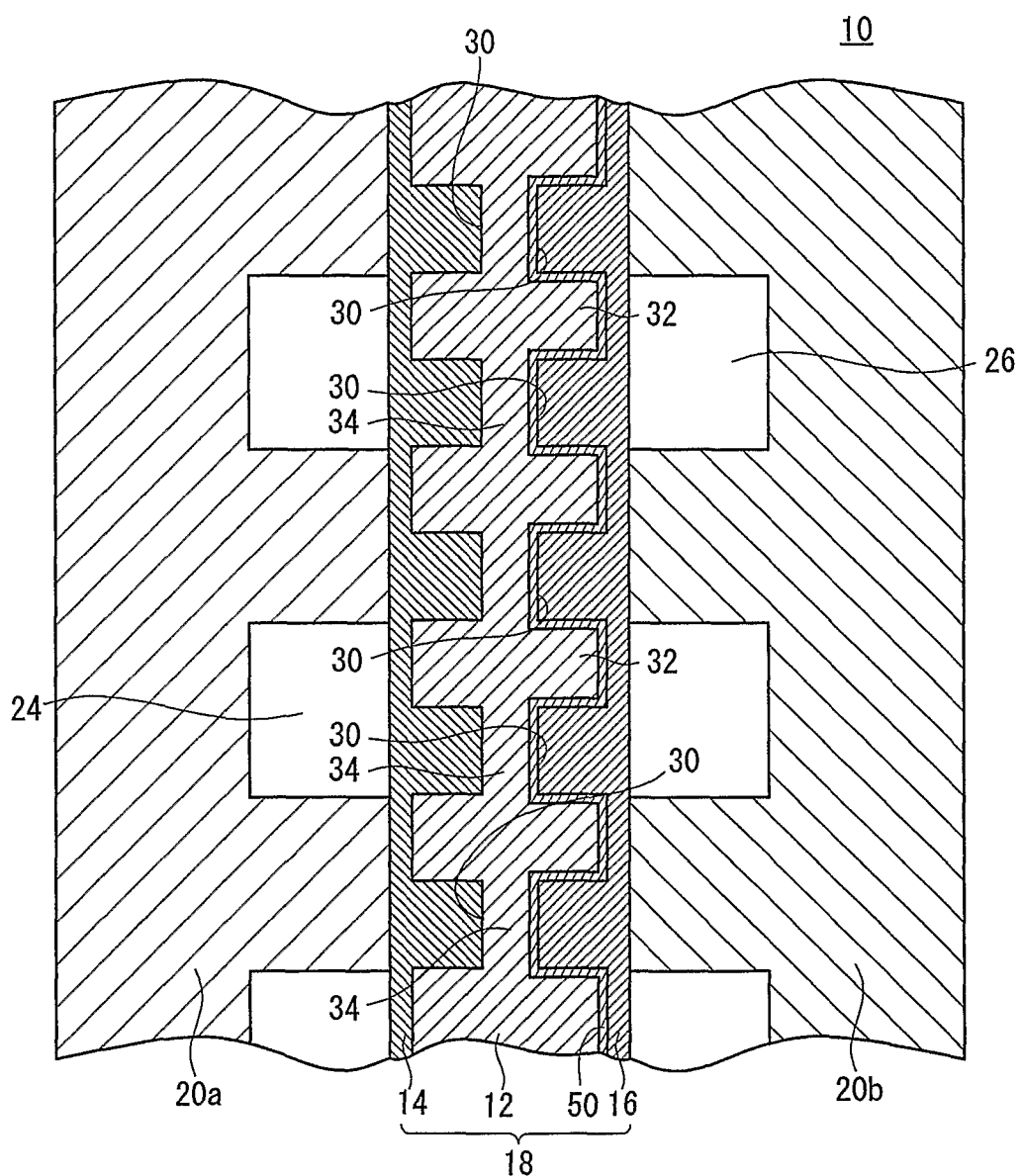
FIG. 13 is a schematic vertical sectional view illustrating principal components of a unit cell of a SOFC, provided with an electrolyte electrode assembly according to still another embodiment.

Further, alternatively, both respective end surfaces of the solid electrolyte 12, which are disposed on respective sides facing the anode 14 and the cathode 16, may be depressed. As shown in FIG. 13, columnar recesses 30 and/or other depressions, which are provided on the respective end surfaces of the solid electrolyte 12 on sides thereof facing the anode 14 and the cathode 16, may be filled, whereby the anode 14 and the cathode 16 are formed, in which surfaces thereof facing the separators 20a, 20b are flat.

In any case, for example, an intermediate layer 50 may be provided, which intervenes between the solid electrolyte 12 and the cathode 16 (see FIGS. 12 and 13).

Example 1

A powder of stabilized zirconia doped with 10 mole % of $Sc_2O_3$ (10ScSZ) was formed into a disk-shaped member having a diameter of 60 mm and a thickness of 2 mm, by using a uniaxial hand press forming machine in order to prepare a solid electrolyte. Subsequently, the solid electrolyte is calcined while being maintained at 1,500° C. Thereafter, a surface grinding process was performed using a surface grinding machine, until the thickness was 250 μm.

Subsequently, grinding processing was conducted on one end surface of the solid electrolyte in order to provide columnar recesses, using an NC milling machine or a grinding center. The depth of the columnar recesses was 100 μm, wherein the columnar recesses (see FIG. 2) occupied an area making up 45% of the surface area of the solid electrolyte.

Subsequently, SDC was applied to the other end surface of the solid electrolyte by means of screen printing, followed by performing calcination at 1,450° C. in order to provide an intermediate layer.

Subsequently, paste-like Ni-SDC was uniformly applied to surfaces of the columnar recesses and to the one end surface on which the columnar recesses were provided, followed by performing calcination at 1,250° C. in order to form an anode.

Further, a cathode was manufactured by applying $La_{0.5}Sr_{0.5}MnO_3$ (LSM) onto the intermediate layer by means of screen printing, and then performing calcination at 1,100° C. in order to complete construction of an electrolyte electrode assembly.

The conductance per unit area was calculated for the electrolyte electrode assembly, which was constructed as described above. The conductance per unit area was 3.47 S/cm$^2$. Hydrogen was supplied as a fuel gas at 2.86 ml/cm$^2$ to the anode in order to measure the efficiency of the electrolyte electrode assembly under actual use. As a result, a relatively high value of 34.4% was obtained.

Example 2

Powder of 10ScSZ was formed into a sheet-shaped form by means of a doctor blade method, so as to obtain a first sheet-shaped member and a second sheet-shaped member. The first sheet-shaped member was designed such that the thickness thereof after calcination was 10 μm. The second sheet-shaped member was designed such that the thickness thereof after calcination was 45 μm, and was processed to have a honeycomb shape with an opening area of 90%.

On the other hand, powder of stabilized zirconia doped with 3 mole % of $Y_2O_3$ was formed into a sheet-shaped form by means of a doctor blade method, so as to obtain a third sheet-shaped member having a thickness after calcination of μm.

Subsequently, the second sheet-shaped member, the first sheet-shaped member, and the third sheet-shaped member were stacked in this order, wherein the honeycomb-shaped surface of the second sheet-shaped member was exposed. The stack was pressure-joined and formed by means of a hot press in order to provide a solid electrolyte, which was processed into a square having a side dimension of 100 mm, and then calcined at 1,500° C.

Subsequently, SDC was applied onto the third sheet-shaped member of the solid electrolyte by means of screen printing, followed by performing calcination at 1,450° C. in order to provide an intermediate layer.

Subsequently, paste-like Ni-SDC was uniformly applied to the interior and the honeycomb-shaped surface of the second sheet-shaped member, followed by performing calcination at 1,300° C. in order to form an anode.

Further, $La_{0.6}Sr_{0.4}Co_{0.2}Fe_{0.8}O_3$ (LSCF) was applied onto the intermediate layer by means of screen printing, followed by performing calcination at 1,100° C. in order to manufacture a cathode, thereby completing construction of an electrolyte electrode assembly.

The calculated value of conductance per unit area of the electrolyte electrode assembly was 21.5 S/cm². The efficiency was measured under actual use in the same manner as in Example 1. As a result, a high value of 43.1% was exhibited.

Example 3

A powder of $La_{0.9}Sr_{0.1}Ga_{0.8}Mg_{0.2}O_{3-\delta}$ (LSGM) was formed into a disk-shaped member having a diameter of 100 mm and a thickness of 3 mm using a uniaxial hand press forming machine in order to prepare a solid electrolyte. Subsequently, the solid electrolyte is calcined while being maintained at 1,500° C. Thereafter, a surface grinding process was performed using a surface grinding machine, until the thickness was 400 μm.

Subsequently, hexagonal cylinder-shaped recesses having a depth of 165 μm were provided on one end surface of the solid electrolyte, by means of grinding processing using an NC milling machine or a grinding center. The ratio of the area occupied by the hexagonal cylinder-shaped recesses with respect to the solid electrolyte was 85%.

Further, grinding processing was performed from the side of the other flat end surface using a surface grinding machine, whereby the thickness of the portion (thick-walled portion) which had no hexagonal cylinder-shaped recesses thereon was 200 μm.

Subsequently, paste-like Ni-SDC was uniformly applied to the interior and the one end surface on which the hexagonal cylinder-shaped recesses were provided, followed by performing calcination at 1,250° C. in order to form an anode.

A cathode was manufactured by applying $La_{0.5}Sr_{0.5}MnO_3$ (LSM) onto the other flat end surface by means of screen printing, followed by performing calcination at 1,100° C., in order to complete construction of an electrolyte electrode assembly.

The conductance per unit area was calculated for the electrolyte electrode assembly, and as a result, the conductance per unit area was 13.39 S/cm². Hydrogen was supplied as a fuel gas at 2.86 ml/cm² to the anode in order to measure the efficiency of the electrolyte electrode assembly under actual use. As a result, the efficiency was 31.8%.

Example 4

A solid electrolyte, composed of 10ScSZ and having linear grooves provided on only one end surface thereof as shown in FIG. 4, was manufactured in the same manner as in Example 1. The portions (thin-walled portions) formed by the linear grooves had a thickness of 50 μm, whereas the portion (thick-walled portion) lacking such linear grooves had a thickness of 100 μm. Further, the area encompassed by the linear grooves was 60% of the surface area of the solid electrolyte (see FIG. 4).

Subsequently, SDC was applied to an end surface of the solid electrolyte, disposed on the side having the linear grooves therein, by means of screen printing. Thereafter, calcination was conducted at 1,450° C. in order to provide an intermediate layer.

Subsequently, paste-like Ni-SDC was uniformly applied over the end surface disposed on the side lacking linear grooves, followed by performing calcination at 1,250° C. in order to form an anode.

Further, a cathode was manufactured by applying LSM onto the intermediate layer by means of screen printing, and then performing calcination at 1,100° C. in order to obtain an electrolyte electrode assembly constructed as shown in FIG. 12. The end surface of the cathode, disposed on the side facing the separator, was flat.

The conductance per unit area of the above-described electrolyte electrode assembly constructed was calculated, indicating that the conductance per unit area was 9.34 S/cm².

Example 5

A solid electrolyte, composed of 10ScSZ and having a thickness of 150 μm, was manufactured in the same manner as in Example 1. After that, both end surfaces of the solid electrolyte were subjected to processing in order to form columnar recesses therein, as shown in FIG. 2. The depth of each of the columnar recesses was 25 μm. Further, the columnar recesses were provided over an area making up 40% of the surface area of the solid electrolyte.

In this case, the columnar recesses formed respectively on the one end surface and the other end surface of the solid electrolyte were provided at positions corresponding to each other. Accordingly, portions disposed between the columnar recesses at both end surfaces were designated as the thin-walled portions. The portion lacking the columnar recesses was designated as the thick-walled portion. More specifically, the thicknesses of the thin-walled portions and the thick-walled portion, respectively, were 100 μm and 150 μm.

Subsequently, a ceria-based oxide (GDC) was applied to one end surface of the solid electrolyte, by means of screen printing, followed by performing calcination thereon at 1,450° C. in order to provide an intermediate layer.

Subsequently, a paste-like compound of Ni-SDC was uniformly applied to the other end surface of the solid electrolyte, followed by performing calcination thereon at 1,250° C. in order to form an anode.

Further, LSCF was applied onto the intermediate layer by means of screen printing, followed by performing calcination thereon at 1,100° C. in order to manufacture a cathode, whereupon an electrolyte electrode assembly, constructed as shown in FIG. 13, was obtained. End surfaces of both the anode and the cathode, disposed on sides facing the separator, were made flat.

The conductance per unit area of the electrolyte electrode assembly was 5.13 S/cm².

Comparative Example 1

A powder of stabilized zirconia doped with 8 mole % of $Y_2O_3$ was formed into a disk member, having a diameter of 80 mm and a thickness of 2 mm, using a uniaxial hand press forming machine, and then calcined at 1,450° C. Then, surface grinding was performed using a surface grinding machine, until the thickness was 150 μm.

Subsequently, SDC was applied to one end surface of the solid electrolyte by means of screen printing, followed by performing calcination at 1,450° C. in order to provide an intermediate layer.

Subsequently, Ni—ScSZ was applied to the other end surface by means of screen printing, followed by performing calcination at 1,300° C. in order to form an anode.

Further, a cathode was manufactured by applying LSCF onto the intermediate layer by means of screen printing, and then performing calcination at 1,100° C. in order to complete construction of an electrolyte electrode assembly.

In the case of the electrolyte electrode assembly, the calculated value of conductance per unit area was as small as 1.58 S/cm². Even when efficiency was actually measured, in accordance with Examples 1 and 2, the efficiency was 24.7%.

Comparative Example 2

A powder of $La_{0.9}Sr_{0.1}Ga_{0.8}Mg_{0.2}O_{3-\delta}$ (LSGM) was formed into a sheet-shape by means of a doctor blade method, in order to obtain a first sheet-shaped member and a second sheet-shaped member. The first sheet-shaped member was designed such that the thickness thereof after calcination was 80 μm. The second sheet-shaped member was designed such that the thickness thereof after calcination was 80 μm. A given amount of a carbon pore-forming agent was added, such that holes were formed making up 80% of the area after calcination. A carbon pore-forming agent was selected wherein the particle diameter thereof was larger than the thickness of the second sheet-shaped formed member after calcination.

Subsequently, the first sheet-shaped member and the second sheet-shaped member were stacked in this order, and a pressure-joining and forming process was performed thereon by means of a hot press, in order to provide a solid electrolyte, and calcined it at 1,500° C. During this process, through-holes were formed only through the second sheet-shaped member as a result of the pore-forming agent, and thus thin-walled portions were generated within the solid electrolyte.

Subsequently, surface grinding was applied from both end surfaces of the solid electrolyte, so that the thickness of the thick-walled portion of the solid electrolyte was made 40 μm, whereas the thickness of the thin-walled portion was made 20 μm. As a result, cracks appeared.

In this case, the calculated value of conductance per unit area of the solid electrolyte was 32.7 S/cm². According to this fact, it is postulated that an electrolyte electrode assembly cannot be obtained with ease when the calculated value of conductance per unit area of the solid electrolyte is excessively large.

The invention claimed is:

1. An electrolyte electrode assembly formed by an anode and a cathode with a solid electrolyte interposed therebetween, wherein:
    a thick-walled portion, and a thin-walled portion having a thickness smaller than that of said thick-walled portion, are provided on at least one of an end surface of said solid electrolyte disposed on a side facing said anode and an end surface disposed on a side facing said cathode, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode;
    said thickness of said thick-walled portion is larger than respective thicknesses of said anode and said cathode; and
    conductance per unit area of said electrolyte electrode assembly is 2 to 30 S/cm2 according to a calculation based on a sum total of resistances of said electrolyte electrode assembly and an area of said solid electrolyte, the sum total of resistances of said electrolyte electrode assembly being determined by adding resistances of said anode and said cathode to a resistance of said solid electrolyte calculated based on a sum of resistances of said thick-walled portion and said thin-walled portion.

2. The electrolyte electrode assembly according to claim 1, wherein a ratio of an area occupied by said thin-walled portion in said solid electrolyte is within 90% of a surface area of said solid electrolyte.

3. The electrolyte electrode assembly according to claim 1, wherein said thickness of said thick-walled portion is 60 to 500 μm.

4. The electrolyte electrode assembly according to claim 1, wherein a thickness of said thin-walled portion is not less than 5 μm.

5. The electrolyte electrode assembly according to claim 1, wherein said thin-walled portion is disposed on said end surface facing said anode.

6. The electrolyte electrode assembly according to claim 1, wherein an intermediate layer is disposed between said solid electrolyte and at least one of said cathode and said anode.

7. A method for producing an electrolyte electrode assembly formed by an anode and a cathode with a solid electrolyte interposed therebetween, comprising the steps of:
    manufacturing said solid electrolyte by compressing and forming a powder material to be formed into said solid electrolyte;
    providing a thin-walled portion by depressing at least one end surface of said solid electrolyte while allowing a residual portion to remain as a thick-walled portion, followed by calcination, or by depressing at least one end surface of said solid electrolyte after calcining said solid electrolyte while allowing a residual portion to remain as said thick-walled portion, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode; and
    providing said anode, having a thickness smaller than that of said thick-walled portion, on said one end surface of said solid electrolyte, while providing said cathode, having a thickness smaller than that of said thick-walled portion, on another end surface of said solid electrolyte, wherein said material of said solid electrolyte, said thickness of said thick-walled portion, a thickness of said thin-walled portion, and the materials and said thicknesses of said anode and said cathode are defined such that conductance per unit area of said electrolyte electrode assembly is 2 to 30 S/cm2 according to a calculation based on a sum total of resistances of said electrolyte electrode assembly and an area of said solid electrolyte, the sum total of resistances of said electrolyte electrode assembly being determined by adding resistances of said anode and said cathode to a resistance of said solid electrolyte calculated based on a sum of resistances of said thick-walled portion and said thin-walled portion.

8. A method for producing an electrolyte electrode assembly formed by an anode and a cathode with a solid electrolyte interposed therebetween, comprising the steps of:
    manufacturing a sheet member by forming, into a sheet-shaped form, a powder material to be formed into said solid electrolyte;
    providing said solid electrolyte by stacking a plurality of said sheet members and performing a pressure-joining and forming process on said sheet members;
    calcining said solid electrolyte; and
    providing said anode, having a thickness smaller than that of a thick-walled portion, on one end surface of said solid electrolyte, while providing said cathode, having a thickness smaller than that of said thick-walled portion, on another end surface of said solid electrolyte, wherein a thin-walled portion is provided by depressing one end surface of at least one of said sheet members, or depressing at least one end surface of said solid electrolyte, with a residual portion thereof forming said thick-walled portion, followed by calcination, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode; and
    wherein said material of said solid electrolyte, said thickness of said thick-walled portion, a thickness of said thin-walled portion, and the materials and said thicknesses of said anode and said cathode are defined such that conductance per unit area of said electrolyte electrode assembly is 2 to 30 S/cm2 according to a calculation based on a sum total of resistances of said electrolyte electrode assembly and an area of said solid electrolyte, the sum total of resistances of said electrolyte electrode assembly being determined by adding resistances of said anode and said cathode to a resistance of said solid electrolyte calculated based on a sum of resistances of said thick-walled portion and said thin-walled portion.

9. A method for producing an electrolyte electrode assembly formed by an anode and a cathode with a solid electrolyte interposed therebetween, comprising the steps of:
    manufacturing a sheet member by forming, into a sheet-shaped form, a powder material to be formed into said solid electrolyte;
    providing said solid electrolyte by stacking a plurality of said sheet members and performing a pressure-joining and forming process on said sheet members;
    calcining said solid electrolyte; and
    providing said anode, having a thickness smaller than that of a thick-walled portion, on one end surface of said solid electrolyte, while providing said cathode, having a thickness smaller than that of said thick-walled portion, on another end surface of said solid electrolyte,
    wherein a thin-walled portion is provided by depressing at least one end surface of said solid electrolyte after calcination, while allowing a residual portion to remain as said thick-walled portion, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode, and
    wherein said material of said solid electrolyte, said thickness of said thick-walled portion, a thickness of said thin-walled portion, and the materials and said thicknesses of said anode and said cathode are defined such that conductance per unit area of said electrolyte electrode assembly is 2 to 30 S/cm2 according to a calculation based on a sum total of resistances of said electrolyte electrode assembly and an area of said solid electrolyte, the sum total of resistances of said electrolyte electrode assembly being determined by adding resistances of said anode and said cathode to a resistance of said solid-electrolyte calculated based on a sum of resistances of said thick-walled portion and said thin-walled portion.

10. A method for producing an electrolyte electrode assembly formed by an anode and a cathode with a solid electrolyte interposed therebetween, comprising the steps of
    manufacturing said solid electrolyte by performing a compressing and forming process, after embedding a pore-forming agent into at least one end surface of a powder material to be formed into said solid electrolyte;
    calcining said solid electrolyte to cause said pore-forming agent to disappear, so that a thin-walled portion is provided while allowing a residual portion to remain as a thick-walled portion; and
    providing said anode, having a thickness smaller than that of said thick-walled portion, on one end surface of said solid electrolyte, while providing said cathode, having a thickness smaller than that of said thick-walled portion, on another end surface of said solid electrolyte, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode,
    wherein said material of said solid electrolyte, said thickness of said thick-walled portion, a thickness of said thin-walled portion, and the materials and said thicknesses of said anode and said cathode are defined such that conductance per unit area of said electrolyte electrode assembly is 2 to 30 S/cm2 according to a calculation based on a sum total of resistances of said electrolyte electrode assembly and an area of said solid electrolyte, the sum total of
    resistances of said electrolyte electrode assembly being determined by adding resistances of said anode and said cathode to a resistance of said solid electrolyte calculated based on a sum of resistances of said thick-walled portion and said thin-walled portion.

11. A method for producing an electrolyte electrode assembly formed by an anode and a cathode with a solid electrolyte interposed therebetween, comprising the steps of:

manufacturing a sheet member by forming, into a sheet-shaped form, a powder material to be formed into said solid electrolyte;

providing said solid electrolyte by stacking a plurality of said sheet members and performing a pressure-joining and forming process on said sheet members;

calcining said solid electrolyte; and providing said anode, having a thickness smaller than that of a thick-walled portion, on one end surface of said solid electrolyte, while providing said cathode; having a thickness smaller than that of said thick-walled portion, on another end surface of said solid electrolyte, the anode or the cathode being depressed at portions corresponding to the thin walled portions of the solid electrolyte, the anode or the cathode thereby including a recessed portion adjacent to the thin walled portion, a separator, adjacent to the anode or cathode with the recessed portion, including a depressed portion forming a groove reactant passage adjacent to the recessed portion of the anode or cathode, wherein a pore-forming agent is added to at least one of said sheet members to be calcined, and wherein said material of said solid electrolyte, said thickness of said thick-walled portion, a thickness of a thin-walled portion, and the materials and said thicknesses of said anode and said cathode are defined such that conductance per unit area of said electrolyte electrode assembly is 2 to 30 S/cm2 according to a calculation based on a sum total of resistances of said electrolyte electrode assembly and an area of said solid electrolyte, the sum total of resistances of said electrolyte electrode assembly being determined by adding resistances of said anode and said cathode to a resistance of said solid electrolyte calculated based on a sum of resistances of said thick-walled portion and said thin-walled portion.

* * * * *